US006236960B1

(12) United States Patent
Peng et al.

(10) Patent No.: US 6,236,960 B1
(45) Date of Patent: *May 22, 2001

(54) FACTORIAL PACKING METHOD AND APPARATUS FOR INFORMATION CODING

(75) Inventors: Weimin Peng, Schaumburg; Edgardo Manuel Cruz Zeno, Round Lake; James Patrick Ashley, Naperville, all of IL (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/370,057

(22) Filed: Aug. 6, 1999

(51) Int. Cl.[7] ............................ G10L 21/04; G10L 15/00

(52) U.S. Cl. ......................... 704/211; 704/201; 704/500; 704/236

(58) Field of Search .................................... 704/221, 222, 704/201, 204, 503, 500, 200, 211, 236

(56) References Cited

U.S. PATENT DOCUMENTS

| | | | | |
|---|---|---|---|---|
| 4,821,290 | * | 4/1989 | Hingorani et al. | 375/242 |
| 5,235,670 | * | 8/1993 | Lin et al. | 704/200 |
| 5,388,181 | * | 2/1995 | Anderson et al. | 704/222 |
| 5,596,589 | * | 1/1997 | Thomsen et al. | 714/759 |
| 5,724,097 | * | 3/1998 | Hibi et al. | 375/240.04 |

OTHER PUBLICATIONS

IEEE Transactions on Image Processing, vol. 7, No. 10, "Error–Resilient Pyramid Vector Quantization for Image Compression", Andy Hung, Ely Tsern, and Teresa Meng, Oct., 1998.

IEEE 1994, "Error Resilient Pyramid Vector Quanitzation for Image Compression", Andy Hung and Teresa Meng, Computer Systems Laboratory, Stanford University, p. 583–586.

IEEE 1997, "Pyramid Vector Coding for High Quality Audio Compression", Daniele Cadel and Giorgio Parladori, p. 343–346.

* cited by examiner

*Primary Examiner*—Tālivaldis I. Šmits
*Assistant Examiner*—Daniel A. Nolan
(74) *Attorney, Agent, or Firm*—Richard A. Sonnetag; Kenneth A. Haas

(57) ABSTRACT

An improved speech coder takes advantage of the fact that any given pulse combination can be uniquely described by the following four properties: number of degenerate pulses, signs of pulses, positions of pulses, and pulse magnitudes. In accordance with the invention, a four stage iterative classification of the pulse combinations, where each stage groups the pulse combinations by one of these four properties, is performed. The process starts with the number of pulses, then determines the total number of possible sign combinations, pulse position combinations, and pulse magnitude combinations. This flexibility allows for the sign combinations to be grouped in the last stage. Since the number of sign combinations is always a power of two, leaving the sign combinations for last along with appropriately ordering the elements in the previous three stages allows the signs to be coded by independent bits, in turn allowing for error protection of those bits.

13 Claims, 8 Drawing Sheets

FACTORIAL PACKING METHOD AND APPARATUS FOR INFORMATION CODING

FIELD OF THE INVENTION

The present invention relates, in general, to communication systems and, more particularly, to coding information signals in such communication systems.

BACKGROUND OF THE INVENTION

Code-division multiple access (CDMA) communication systems are well known. One exemplary CDMA communication system is the so-called IS-95 which is defined for use in North America by the Telecommunications Industry Association (TIA). For more information on IS-95, see TIA/EIA/IS-95, *Mobile Station-Base-station Compatibility Standard for Dual Mode Wideband Spread Spectrum Cellular System,* January 1997, published by the Electronic Industries Association (EIA), 2001 Eye Street, N.W., Washington, D.C. 20006. A variable rate speech codec, and specifically Code Excited Linear Prediction (CELP) codec, for use in communication systems compatible with IS-95 is defined in the document known as IS-127 and titled *Enhanced Variable Rate Codec, Speech Service Option* 3 *for Wideband Spread Spectrum Digital Systems,* September 1996. IS-127 is also published by the Electronic Industries Association (EIA), 2001 Eye Street, N.W., Washington, D.C. 20006.

In the IS-127 Rate 1 case (8.5 kbps), the fixed codebook (FCB) uses a multipulse configuration (known as Algebraic Code Excited Linear Prediction or ACELP) in which the excitation vector $c_k$ contains only eight non-zero, unit magnitude values, or "pulses". For the eight pulses, there are 35 bits allocated for the pulse positions and associated signs for each of the three subframes (of length L=[53, 53, 54]). An associated "track" defines the allowable positions for each of the eight pulses within $c_k$ as defined in IS-127. In this configuration, three of the tracks contain two pulses and two tracks contain only one pulse. As shown in Table 1 (from Table 4.5.7.1-1 of IS-127), the pulse(s) on track 0 can occupy positions 0, 5, 10, . . . , 50, pulse(s) on track 2 can occupy positions 1, 6, 11, . . . , 51, and so on. This is known as "interleaved pulse permutation." The positions of the eight pulses are then chosen in a manner such that equation (12), recited below, is maximized in a reasonable number of iterations.

TABLE 1

IS-127 Rate 1 Pulse Positions Definitions

| Track | Positions |
|---|---|
| T0 | 0, 5, 10, 15, 20, 25, 30, 35, 40, 45, 50 |
| T1 | 1, 6, 11, 16, 21, 26, 31, 36, 41, 46, 51 |
| T2 | 2, 7, 12, 17, 22, 27, 32, 37, 42, 47, 52 |
| T3 | 3, 8, 13, 18, 23, 28, 33, 38, 43, 48, 53 |
| T4 | 4, 9, 14, 19, 24, 29, 34, 39, 44, 49, 54 |

In an effort to improve upon the IS-127 codebook design for higher bit rates, a design requirement may be to have twelve total pulses with three pulses on each of four separate tracks, with subframe sizes of L=[53, 53, 54], and a bit allocation of 48 bits per subframe. The advantage of having multiple pulses on a given track is (at least) twofold. First, multiple pulse tracks tend to be longer because there are fewer of them. This promulgates greater flexibility in pulse positioning; i.e., shorter track lengths limit flexibility and can potentially force pulses into suboptimal positions, resulting in decreased performance. Secondly, multiple pulses can "degenerate" into fewer pulses, i.e., pulses can occupy the same positions and become additive. This tends to refine the shape of the excitation sequence and hence, be a closer match to the target signal by providing limited amplitude information, as a byproduct of positioning information. Here, some of the benefits of the traditional multipulse (amplitude and position) are preserved. For additional information, see the article by I. M. Transcoso and B. S. Atal titled "Efficient Procedures for Finding the Optimum Innovation in Stochastic Coders" in the *Proc. Int. Conf. Acoust., Speech, Signal Processing,* 1987 at pages 1957–1960.

In the given scenario, the tracks would be configured as 4 tracks×14 positions=56 total positions, which could be positioned according to Table 2. Here, the bit allocation of 48 bits would be divided between the 4 tracks equally so that each track would receive 12 bits. The 12 bits per track would further be composed of 3 bits for each position and 1 sign bit to indicate the polarity of the each pulse. The problem is that only 8 positions can be represented by 3 bits ($2^3$=8). Coding the positions using 4+1=5 bits per pulse would require 60 bits per subframe, so that it is obvious that the requirement cannot be met in such a straightforward manner.

TABLE 2

Required Pulse Position Definitions

| Track | Positions |
|---|---|
| T0 | 0, 4, 8, 12, 16, 20, 24, 28, 32, 36, 40, 44, 48, 52 |
| T1 | 1, 5, 9, 13, 17, 21, 25, 29, 33, 37, 41, 45, 49, 53 |
| T2 | 2, 6, 10, 14, 18, 22, 26, 30, 34, 38, 42, 46, 50, 54 |
| T3 | 3, 7, 11, 15, 19, 23, 27, 31, 35, 39, 43, 47, 51, 55 |

A method for pulse coding that is known in the prior art deals with multiplexing the indices of two pulses into a single codeword. For example, in the IS-127 Rate 1 case (8.5 kbps), there are 11 possible pulse positions spread over five tracks. Rather than using four bits for each pulse position, the positions of two pulses can be coded jointly using only seven bits. This is accomplished by considering that the total number of positions for two pulses is 11×11=121, which is less than the total number of positions that can be coded with seven bits ($2^7$=128). Details of the coding can then be expressed as:

$$\text{codeword} = N_{pos} \cdot \left\lfloor \frac{p_i}{N_{track}} \right\rfloor + \left\lfloor \frac{p_j}{N_{track}} \right\rfloor$$

where $p_i$ and $p_j$ are the positions of the i-th and j-th pulses, $N_{pos}$ is the number of pulse positions per track, $N_{track}$ is the number of tracks, and $\lfloor x \rfloor$ represents the largest integer less than or equal to x. The pulse positions can then be extracted at the decoder by:

$$\lambda_i = \left\lfloor \frac{\text{codeword}}{N_{pos}} \right\rfloor, \quad \lambda_j = \text{codeword} - N_{pos} \cdot \lambda_i,$$

where $\lambda_i$ and $\lambda_j$ are the decimated positions within the appropriate track, which corresponds to the columns in Table 2 (i.e., $p_i = N_t \lambda_i + n$ where $N_t$ is the number of tracks, and n is the track number). The problem with using this method for the 14 position, 3 pulse track case in Table 2, is that a 14×14×14=2,744 position multiplex would still require 12 bits ($2^{12}$=4096 possible positions), so there is no savings over simply using four bits for each pulse position.

In the case of multiple pulse tracks, however, there is a built-in redundancy that has been exploited in the prior art. Again in IS-127, the two pulse track positions are indistinct, i.e., the first pulse can be interchanged with the second pulse with no change in outcome. Therefore, efficient sign coding has been embedded in the position information: if the signs of the two pulses are the same, the packing order is such that the pulses are ascending in position (i.e., the position of the first pulse is less than or equal to the position of the second pulse, or $p_i \leqq p_j$). Otherwise, the positions are descending (the position of the first pulse is greater than the position of the second pulse, or $p_i > p_j$). This allows the tracks to be coded using only 7 bits plus 1 sign bit (instead of 2) for a total of 8 bits for an 11 position double pulse track.

In a triple pulse track, however, the complexity of this problem grows at a factorial rate. Rather than having 2!=2 permutations of indistinct pulses as described above, there are 3!=6 permutations, as shown in Table 3. In addition, there are 4 combinations of pulse degeneracy, in which two or more pulses occupy the same positions, also shown in Table 3.

TABLE 3

Redundancies in Triple Pulse Coding

| Indistinct Pulse Combinations | Degenerative Pulse Combinations |
|---|---|
| $p_i \leqq p_j \leqq p_k$ | $p_i = p_j \neq p_k$ |
| $p_i \leqq p_k \leqq p_j$ | $p_i \neq p_j = p_k$ |
| $p_j \leqq p_i \leqq p_k$ | $p_i = p_k \neq p_j$ |
| $p_k \leqq p_j \leqq p_i$ | $p_i = p_j = p_k$ |
| $p_j \leqq p_k \leqq p_i$ | |
| $p_k \leqq p_i \leqq p_j$ | |

One problem with the prior art in this case is that the number of indistinct pulse combinations (3!=6) exceeds the total number of sign change combinations ($2^{(3-1)}$=4 required to embed the sign information with the position information. This results in a coding inefficiency since only two thirds (⅔) of the position information is required to embed the sign change information, thus one third of the total coded representations will be redundant. This problem is further exemplified in Table 4, which shows how the coding inefficiencies in the prior art grow as the number of pulses per track increases. Here, as the number of pulses per track m increases, the corresponding pulse sign combinations increase as $2^m$. Extending the information in Table 3, the number of position combinations that can be used to embed the sign information implicitly (according to the prior art) increases as m!. If this number is less than the number of required pulse sign combinations, then explicit sign bits (shown in column 3 of Table 4) are required to code all the information. Otherwise, no explicit sign bits are needed.

But as the number of pulses per track increases, the available coding space (m!) far exceeds the amount of information needed to be coded ($2^m$), hence the coding efficiency (defined as $E=2^{(m-s)}/m!$) becomes impractically low. The efficiency can also be thought of in terms of effective bit loss ($-\log_2(E)$), which can be observed to be quite high.

TABLE 4

Inefficiencies in multiple pulse coding using the prior art

| Number of pulses per track (m) | Required pulse sign combinations ($2^m$) | Available pulse sign combinations from positioning (m!) | Required number of dedicated sign bits (s) | Coding efficiency (assuming 100% position efficiency, e.g., 8, 16, 32 positions) | Effective bit loss per track |
|---|---|---|---|---|---|
| 2 | 4 | 2 | 1 | 100.00% | 0.0 |
| 3 | 8 | 6 | 1 | 66.67% | 0.6 |
| 4 | 16 | 24 | 0 | 66.67% | 0.6 |
| 5 | 32 | 120 | 0 | 26.67% | 1.9 |
| 6 | 64 | 720 | 0 | 8.89% | 3.5 |
| 7 | 128 | 5040 | 0 | 2.54% | 5.3 |
| 8 | 256 | 40320 | 0 | 0.63% | 7.3 |
| 9 | 512 | 362880 | 0 | 0.14% | 9.5 |
| 10 | 1024 | 3628800 | 0 | 0.03% | 11.8 |

In addition, the degenerate pulse combinations further degrade coding efficiency as the number of pulses to be coded increases. This is due to the inherent property that all pulses at a given position will have the same sign (since pulses at the same position with opposite sign will cancel). Thus, there is no need to code the pulse sign information for degenerated pulses independently.

Returning to the original problem of coding 3 pulses on 14 positions using only 12 bits, and using the information in Table 4, we can apply the prior art position coding with 1 dedicated sign bit to yield a codeword length of 1+(3*4)=13 bits. This, however does not meet the requirement of 12 bits (or 48 bits per subframe). Furthermore, as more and more pulses are to be coded within a single track, the prior art becomes more and more inefficient. Thus, a need exists for an improved method and apparatus which overcomes the deficiencies of the prior art and allows efficient coding of multiple pulse position tracks.

DETAILED DESCRIPTION OF THE PREFERRED EMBODIMENT

Figure 1:
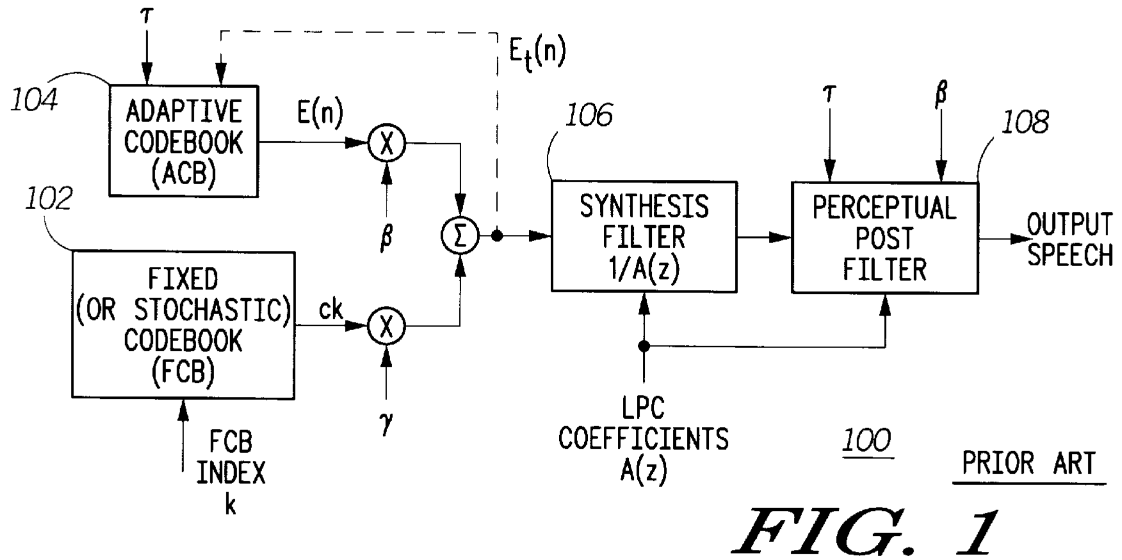
FIG. 1 generally depicts a CELP decoder as is known in the prior art.

Stated generally, an improved speech coder takes advantage of the fact that any given pulse combination can be uniquely described by the following four properties: number of degenerate pulses, signs of pulses, positions of pulses, and pulse magnitudes. In accordance with the invention, a four stage iterative classification of the pulse combinations, where each stage groups the pulse combinations by one of these four properties, is performed. The process starts with the number of pulses, then determines the total number of possible sign combinations, pulse position combinations, and pulse magnitude combinations. This flexibility allows for the sign combinations to be grouped in the last stage. Since the number of sign combinations is always a power of two, leaving the sign combinations for last along with appropriately ordering the elements in the previous three stages allows the signs to be coded by independent bits, in turn allowing for error protection of those bits.

More specifically, a method of coding an information signal in a communication system comprises the steps of dividing the information signal into blocks and deriving a target signal based on a block of the information signal. The method further includes the steps of generating a quantized signal which is representative of the target signal, generating a codeword which is comprised of a sum of offsets or indices which relate to the respective number of pulses, pulse positions, pulse magnitudes, and/or pulse signs within the quantized signal, wherein at least one of the offsets or indices is based on the relation:

$$F(n,\ d) = \frac{n!}{d!(n-d)!},$$

and transmitting said codeword to a destination. In the preferred embodiment, the information signal is a speech, audio, image, or video signal and the blocks of information signals further comprise frames or subframes of information signals. Also, the quantized signal further comprises a codevector $c_k$. The offset or index related to the position information is based on the relation:

$$F(n,\ d) = \frac{n!}{d!(n-d)!}$$

where d is a number of non-zero elements and n is a number of positions, while the offset or index related to the pulse magnitude information is based on the relation:

$$D(m,\ d) = \frac{(m-1)!}{(d-1)!(m-d)!},$$

where d is a number of non-zero elements and m is a total number of unit magnitude pulses.

Stated differently, a method of generating a codeword in a communication system comprises the steps of dividing a total number of codewords into a group representing a particular number of pulses and determining a first offset related thereto and subdividing the group representing a particular number of pulses into subgroups representing particular pulse positions and determining a second offset related thereto. The method further includes the steps of subdividing a subgroup representing particular pulse positions into further subgroups representing particular pulse magnitudes and determining a third offset related thereto, determining an index representing a particular pulse sign combination and summing the first, second and third offsets and the index to generate the codeword.

The first offset is given by the equation $$offset_{stage\,1} = S_{off}(d,\ m,\ n) = \begin{cases} \sum_{i=d+1}^{m} D(m,\ i) \cdot F(n,\ i) \cdot 2^i & ,\ d < m \\ 0 & ,\ d = m \end{cases}$$

where n is the decimated track length, d is the number of pulses and m is the total number of unit magnitude pulses used to generate the d pulses while the second offset is given by the equation $$\text{offset}_{stage2=} I_{pos}(\lambda,d) \cdot D(m,d) \cdot 2^d$$

where $I_{pos}$ is the index of the position information, $\lambda \equiv [\lambda_0\ \lambda_1\ .\ .\ .\ \lambda_{d-1}]$, with $\lambda_i$ representing the decimated pulse position of pulse i in the track vector of pulse magnitudes t and $D(m,d) \cdot 2^d$ is the number of elements in a subgroup.

The third offset is given by the equation $$offset_{stage\,3} = 2^d \cdot \sum_{k=1}^{m-d+1} (I_{off}(d^{(k)},\ m^{(k)},\ n^{(k)}) + D(m^{(k)},\ d^{(k)}) \cdot I_{pos}(\gamma^{(k)},\ n^{(k)}))$$

while the index is given by the equation $$index_{stage\,4} = S_{pos}(t) = \sum_{j=0}^{d-1} s_j \cdot 2^{d-j-1}.$$

A corresponding apparatus performs, inter alia, the above recited steps in accordance with the invention.

FIG. 1 generally depicts a Code Excited Linear Prediction (CELP) decoder 100 as is known in the art. As shown in FIG. 1, the excitation sequence or "codevector" $c_k$, is generated from a fixed codebook (FCB) 102 using the appropriate codebook index k. This signal is scaled using the FCB gain factor λ and combined with a signal E(n) output from an adaptive codebook 104 (ACB) and scaled by a factor β, which is used to model the long term (or periodic) component of a speech signal (with period τ). The signal $E_t(n)$, which represents the total excitation, is used as the input to the LPC synthesis filter 106, which models the coarse short term spectral shape, commonly referred to as "formants". The output of the synthesis filter 106 is then perceptually postfiltered by perceptual postfilter 108 in which the coding distortions are effectively "masked" by amplifying the signal spectra at frequencies that contain high speech energy, and attenuating those frequencies that contain less speech energy. Additionally, the total excitation signal $E_t(n)$ is used as the adaptive codebook for the next block of synthesized speech.

Figure 2:
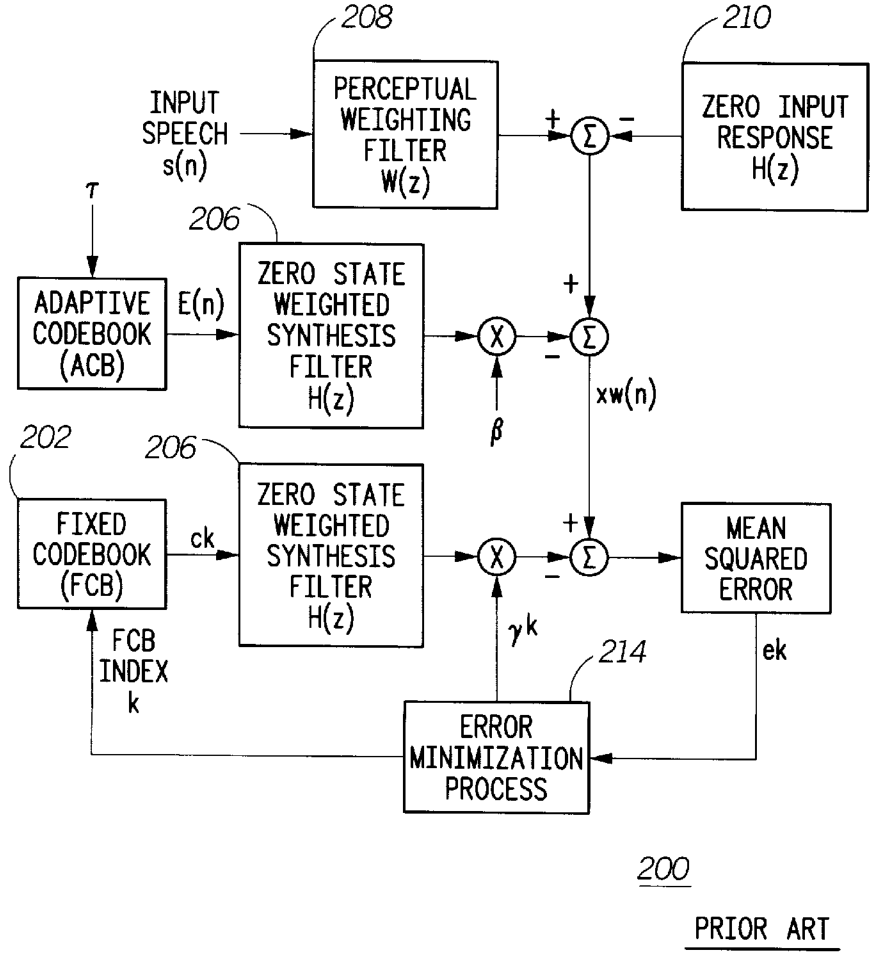
FIG. 2 generally depicts a Code Excited Linear Prediction (CELP) encoder as is known in the prior art.

FIG. 2 generally depicts a CELP encoder 200. Within CELP encoder 200, the goal is to code the perceptually weighted target signal $x_w(n)$, which can be represented in general terms by the z-transform:

$$X_w(z) = S(z)W(z) - \beta E(z)H_{ZS}(z) - H_{ZIR}(z) \quad (1)$$

where W(z) is the transfer function of the perceptual weighting filter 208, and is of the form:

$$W(z) = \frac{A(z/\lambda_1)}{A(z/\lambda_2)} \tag{2}$$

and H(z) is the transfer function of the perceptually weighted synthesis filters 206 and 210, and is of the form:

$$H(z) = \frac{1}{A_q(z)} W(z), \tag{3}$$

and where A(z) are the unquantized direct form LPC coefficients, $A_q(z)$ are the quantized direct form LPC coefficients, and $\lambda_1$ and $\lambda_2$ are perceptual weighting coefficients. Additionally, $H_{ZS}(z)$ is the "zero state" response of H(z) from filter 206, in which the initial state of H(z) is all zeroes, $H_{ZIR}(z)$ is the "zero input response" of H(z) from filter 210, in which the previous state of H(z) is allowed to evolve with no input excitation. The initial state used for generation of $H_{ZIR}(z)$ is derived from the total excitation $E_t(n)$ from the previous subframe.

To solve for the parameters necessary to generate $x_w(n)$, a fixed codebook (FCB) closed loop analysis in accordance with the invention is described. Here, the codebook index k is chosen to minimize the mean square error between the perceptually weighted target signal $x_w(n)$ and the estimated target signal $\hat{x}_w(n)$. This can be expressed in time domain form as:

$$\min_k \left\{ \sum_{n=0}^{L-1} (x_w(n) - \gamma_k c_k(n) * h(n))^2 \right\}, \quad 0 \le k < M, \tag{4}$$

where $c_k(n)$ is the codevector corresponding to FCB codebook index k, $\lambda_k$ is the optimal FCB gain associated with codevector $c_k(n)$, h(n) is the impulse response of the perceptually weighted synthesis filter H(z), M is the codebook size, L is the subframe length, * denotes the convolution process and $\hat{x}_w(n)=\lambda_k c_k(n)*h(n)$ is the estimated target signal. In the preferred embodiment, speech is coded every 20 milliseconds (ms) and each frame includes three subframes of length L.

Eq. 4 can also be expressed in vector-matrix form as:

$$\min_k\{(x_w-\lambda_k Hc_k)^T(x_w-\lambda_k Hc_k)\},\ 0 \leqq k<M, \tag{5}$$

where $c_k$ and $x_w$ are length L column vectors, H is the L×L zero-state convolution matrix:

$$H = \begin{bmatrix} h(0) & 0 & 0 & \dots & 0 \\ h(1) & h(0) & 0 & \dots & 0 \\ h(2) & h(1) & h(0) & \dots & 0 \\ \vdots & \vdots & \vdots & \ddots & \vdots \\ h(L-1) & h(L-2) & h(L-3) & \dots & h(0) \end{bmatrix} \tag{6}$$

and $^T$ denotes the appropriate vector or matrix transpose. Eq. 5 can be expanded to:

$$\min_k\{x^T_w x_w - 2\lambda_k x^T_w Hc_k + \lambda^2_k c^T_k H^T Hc_k\},\ 0 \leqq k<M, \tag{7}$$

and the optimal codebook gain $\lambda_k$ for codevector $c_k$ can be derived by setting the derivative (with respect to $\lambda_k$) of the above expression to zero:

$$\frac{\partial}{\partial \gamma_k}(x_w^T x_w - 2\gamma_k x_w^T Hc_k + \gamma_k^2 c_k^T H^T Hc_k) = 0, \tag{8}$$

and then solve for $\lambda_k$ to yield:

$$\gamma_k = \frac{x_w^T Hc_k}{c_k^T H^T Hc_k}. \tag{9}$$

Substituting this quantity into Eq. 7 produces:

$$\min_k \left\{ x_w^T x_w - \frac{(x_w^T Hc_k)^2}{c_k^T H^T Hc_k} \right\}, \quad 0 \le k < M. \tag{10}$$

Since the first term in Eq. 10 is constant with respect to k, the mean squared error can be minimized by finding:

$$\max_k \left\{ \frac{(x_w^T Hc_k)^2}{c_k^T H^T Hc_k} \right\}, \quad 0 \le k < M. \tag{11}$$

From Eq. 11, it is important to note that much of the computational burden associated with the search can be avoided by precomputing the terms in Eq. 11 which do not depend on k; namely, by letting $d^T=x^T_w H$ and $\Phi=H^T H$. When this is done, Eq. 11 reduces to:

$$\max_k \left\{ \frac{(d^T c_k)^2}{c_k^T \Phi c_k} \right\}, \quad 0 \le k < M, \tag{12}$$

which is equivalent to equation 4.5.7.2-1 of IS-127. The process of precomputing these terms is known as "backward filtering".

Summarizing this process, the codevector $c_k$ (which can be represented by codebook index k) that minimizes the mean squared error between the target signal $x_w(n)$ and the estimated target signal $\hat{x}_w(n)$, can be found by choosing the value of k that maximizes the expression given in (12).

The current invention solves the aforementioned problems by a combination of three methods. First, no indistinct position combinations are coded. Only the number of distinct, non-degenerate position combinations is allowed in the basic coding configuration. Second, rather than the treating degenerate combinations as "overlapped", individual pulses, these cases are treated as separate, non-degenerate cases in which there are fewer pulses of potentially unequal magnitude. Third, given the first two methods, the sign information is dependent only on the number of degenerate pulses and thereby can be coded more efficiently. These methods are detailed as follows, and ultimately combined to form a maximally efficient, scalable coding structure.

First, let us define the number of distinct, non-degenerate pulse combinations by the factorial relation:

$$F(n, d) = \frac{n!}{d!(n-d)!}, \tag{13}$$

where n is the number of possible positions, d is the number of non-zero positions, and $d \leqq n$. Here, we can see that for the simple case of d=2 pulses on n=3 positions, there are only 3!/2!=3 distinct, non-degenerate position combinations described as follows: $[\lambda_i, \lambda_j] \in \{(0,1), (0,2), (1,2)\}$.

Figure 3:
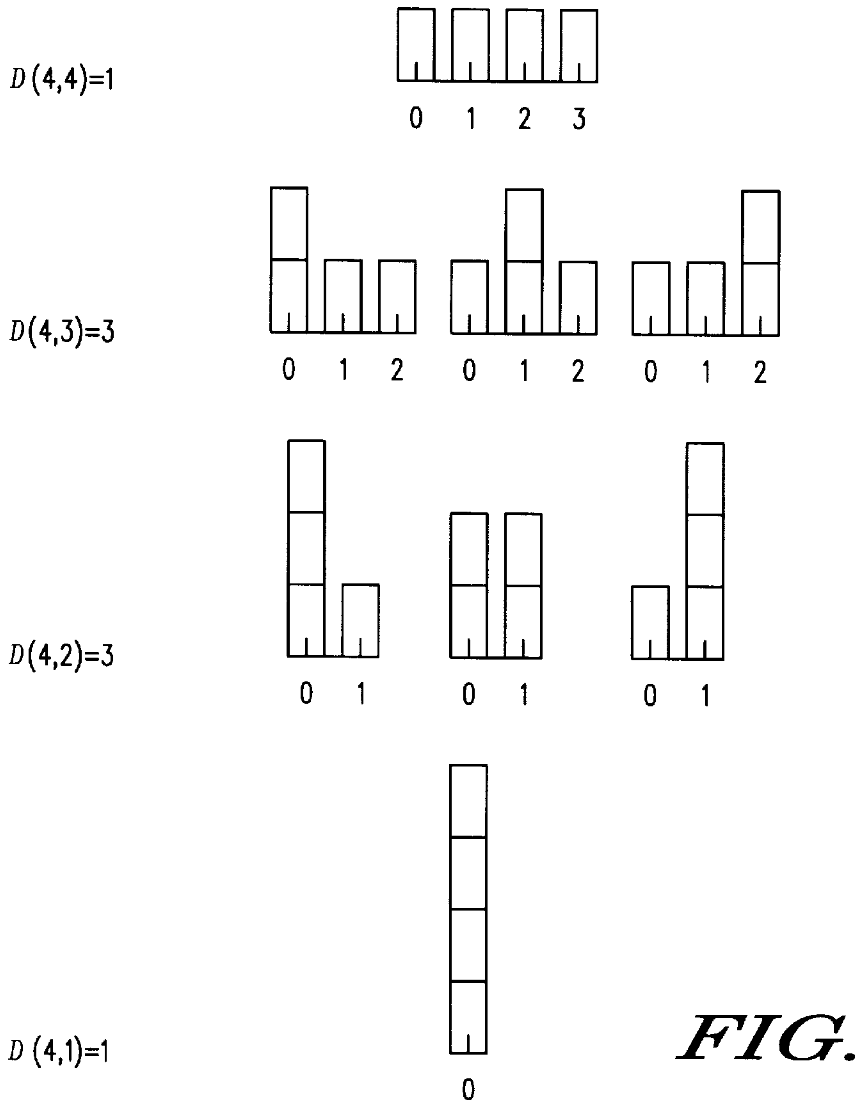
FIG. 3 generally depicts degenerate combinations for four unit magnitude pulses with d∈{1,2,3,4} which results from use of the coding process in accordance with the invention.

Next, we can define the number of degenerate combinations as:

$$D(m, d) = \frac{(m-1)!}{(d-1)!(m-d)!}, \tag{14}$$

where m is the total number of unit magnitude pulses, and d is the number of non-zero positions, which is defined as the number of occupied track positions resulting from a possible superposition of m pulses. For example, in a quadruple pulse case (m=4) that forms two degenerate pulses (d=2), the number of degenerate combinations is D(4,2)=3. This reflects the number of distinct combinations of the degenerated pulses. FIG. 3 shows all degenerate combinations for four unit magnitude pulses with $d \in \{1,2,3,4\}$.

In addition, each set of degenerated pulse combinations requires a corresponding sign to indicate the polarity of the degenerated pulse. This can be expressed as a function of the number of degenerated pulses, i.e. $2^d$. So, the total required minimum number of combinations N and theoretical minimum number of bits M, for a given configuration can be formulated by the expression:

$$N = \sum_{i=1}^{m} 2^i D(m, i) \cdot F(n, i) \leq 2^M. \tag{15}$$

In considering a few examples, one can more readily see the utility of equation (15). In a straightforward example of two pulses (m=2) on a track length of eight (n=8), there are N=(4)(1)(28)+(2)(1)(8)=128 total combinations, or M=7 bits. For the IS-127 case of two pulses (m=2) on a track length of eleven (n=11), there are N=(4)(1)(55)+(2)(1)(11)=242 total combinations, or M=8 bits. As such, the present invention provides additional flexibility in packing order, and therefore allows the more sensitive bits (the sign bits) to be grouped together, as will be described later. In the triple pulse (m=3) example using a track length of n=14, the formulation of the number of bits shows that the requirement of 12 bits per track can be met in accordance with the current invention:

$$N=(2)(1)(14)+(4)(2)(91)+(8)(1)(364)=3668<4096=2^{12}. \tag{16}$$

In considering the examples given in Table 4, we can now directly compare the present invention with the prior art in a more direct manner. For a track length of n=14, Table 5 shows the required codeword size for both the prior art and the current invention as a function of the number of pulses per track (m).

TABLE 5

Comparison of Prior Art vs. Invention (n = 14)

| Number of pulses (m) | Number of bits required per track: Prior Art | Invention |
|---|---|---|
| 2 | 9 | 9 |
| 3 | 13 | 12 |
| 4 | 16 | 15 |
| 5 | 20 | 18 |
| 6 | 24 | 20 |
| 7 | 28 | 22 |
| 8 | 32 | 24 |
| 9 | 36 | 26 |
| 10 | 40 | 27 |

An additional case of interest rises from the factorial packing method and apparatus in accordance with the invention. Considering a single track of length 54 and seven unit magnitude pulses, equation (15) shows the minimum number of bits required to code the pulse positions, magnitudes, and signs to be 35 bits. This is compatible with the subframe length and bit allocation for the FCB shape in IS-127. Although there is one less pulse when compared to IS-127, this single track approach compensates for the lost pulse by offering greater flexibility in terms of waveform shaping, exploiting the benefits of the traditional multipulse approach but at a relatively low bit rate.

The following discussion shows how the theoretical minimum number of bits can be used to map the respective codebook indices into a form suitable for transmission to a destination. First, it is noticed that any given pulse combination can be uniquely described by the following four properties: number of degenerate pulses, signs of pulses, positions of pulses, and pulse magnitudes. The factorial packing method and apparatus in accordance with the invention performs a four stage iterative classification of the pulse combinations, where each stage groups the pulse combinations by one of these four properties. Although the classification, or grouping, by property can be done in any order, the process is made simpler by starting with the number of pulses. Once this is determined, the total number of possible sign combinations, pulse position combinations, and pulse magnitude combinations can be computed. This flexibility allows for the sign combinations to be grouped in the last stage. Since the number of sign combinations is always a power of two, leaving the sign combinations for last along with appropriately ordering the elements in the previous three stages allows the signs to be coded by independent bits, in turn allowing for error protection of those bits.

Figure 4:
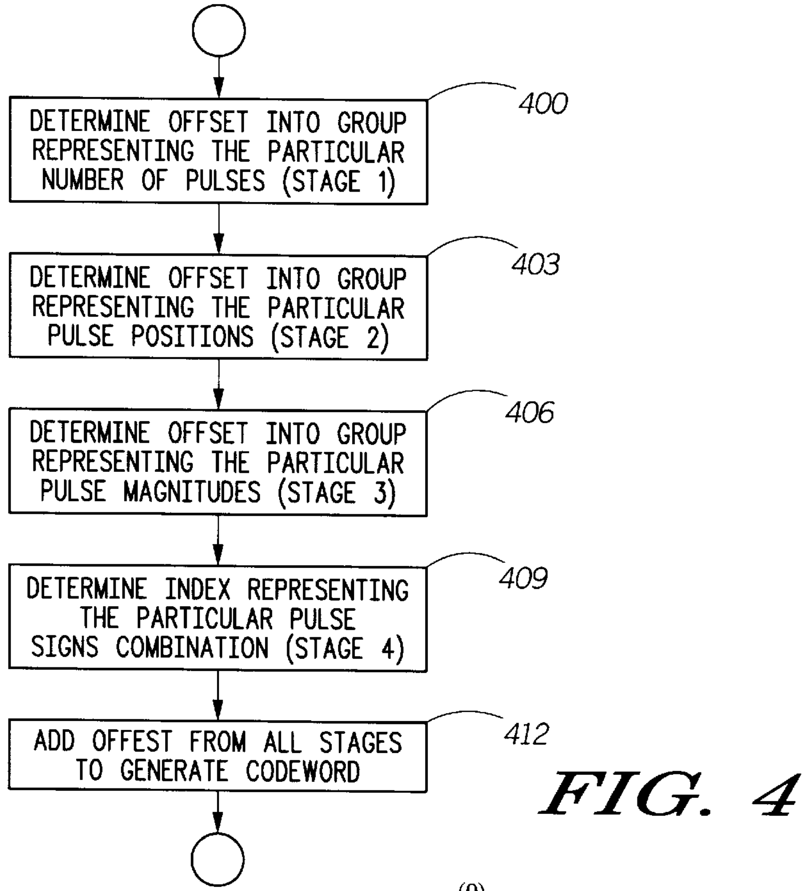
FIG. 4 generally depicts a high level description of the coding process in accordance with the invention.

Again, although the order of the classification stages is arbitrary, having the first stage group by number of non-zero pulse positions and the last stage group by the sign combinations has certain desired properties. For the sake of describing the factorial packing method, the second and third stages are selected to classify the pulse combinations by pulse positions and by pulse magnitudes, respectively. Each group in every stage is assigned a unique set of codes within the total codeword space. The factorial packing process then involves computing offsets into the groups determined in each stage, and adding the offsets up to generate the resulting codeword. FIG. 4 depicts a high level description of the process in accordance with the invention. To begin, the process starts at step 400 (stage 1) where the offset is determined into a group representing the particular number of non-zero pulse positions. Next, at step 403 (stage 2), the offset is determined into a group representing the particular pulse positions and at step 406 (stage 3), the offset is determined into a group representing the particular pulse magnitudes. At step 409 (stage 4), an index representing the particular pulse signs combination is determined and the offsets from all stages are then added to generate the codeword at step 412.

Figure 5:
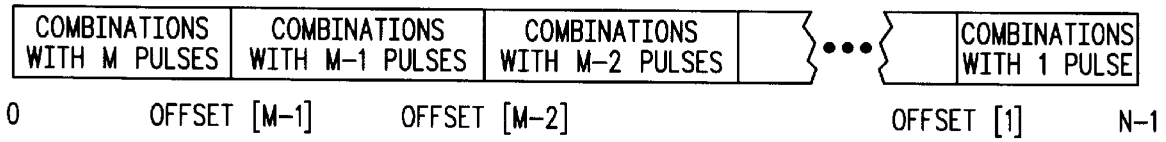
FIG. 5 generally depicts division of the codeword space into m groups after step 400 of FIG. 4 (stage 1) of the factorial packing process in accordance with the invention.

Now, in stage 1, the total space of N codewords is divided into m groups, each representing a different number of non-zero pulse positions. The number of elements in a group with i non-zero pulse positions is given by the number of pulse position combinations F(n,i) times the number of degenerate pulse combinations D(m,i) times the number of sign combinations $2^i$. Organizing the codeword space so that the first group represents the combinations of m non-zero pulse positions, and the last group represents the combinations of one non-zero pulse position, an offset into a particular subgroup can be computed by the following expression:

$$offset_{stage1} = S_{off}(d, m, n) = \begin{cases} \sum_{i=d+1}^{m} D(m, i) \cdot F(n, i) \cdot 2^i, & d < m, \\ 0, & d = m \end{cases} \quad (17)$$

where n is the decimated track length, d is the number of non-zero pulse positions within n, and m is the total number of unit magnitude pulses used to generate the d non-zero pulses. FIG. 5 depicts how the codeword space is divided into m groups after step 400 of FIG. 4 (stage 1) of the factorial packing process in accordance with the invention.

In stage 2, the selected stage 1 group from FIG. 5 is subdivided into F(n,d) subgroups, each representing a different combination of pulse positions. The pulse positions can be uniquely coded in accordance with the invention by the following expression:

$$I_{pos}(\lambda, d) = \sum_{i=0}^{d-1} F(\lambda_i, i+1), \quad (18)$$

where $I_{pos}$ is the index of the position information, and $\lambda \equiv [\lambda_0\ \lambda_1 \ldots \lambda_{d-1}]$, with $\lambda_i$ representing the decimated pulse position of pulse i in the track vector of pulse magnitudes t. For this expression to generate unique values of $I_{pos}$, it is required that $\lambda_0 < \lambda_1 < \ldots < \lambda_{m-1}$. It is also necessary to redefine the combination expression in equation (13) as follows:

$$F(n, d) = \begin{cases} \frac{n!}{d!(n-d)!}, & n \geq d \\ 0, & n < d \end{cases}, \quad (19)$$

to allow its use in equation (18). This expression is modified purely for notational convenience, and is not an exception to the factorial rules from combinatorial mathematics presented in this invention.

The stage 2 subgroups contain $D(m,d) \cdot 2^d$ elements, depending on their corresponding value of d. The offset into the particular stage 2 subgroup corresponding to d non-zero pulse positions can then be computed by the following expression:

$$offset_{stage2} = I_{pos}(\lambda, d) \cdot D(m, d) \cdot 2^d. \quad (20)$$

Since the position index $I_{pos}$ is unique for each pulse position combination, and equation (18) produces a maximally packed set of indices, i.e., the condition $$I_{pos}(\lambda, d) < F(n, d) \quad (21)$$

is always met, the $offset_{stage2}$ expression in equation (20) is guaranteed to fall within the group size of $D(m,d) \cdot F(n,d) \cdot 2^d$.

In stage 3, the selected stage 2 subgroup is further subdivided into D(m,d) subgroups, each of them containing $2^d$ elements. The selection of a particular stage 3 subgroup is performed in iterations. As described below, each iteration subtracts one from the pulse magnitudes, until no pulses are left. Therefore, the total number of iterations $N_{iter}$ can be pre-determined by knowing the maximum original pulse magnitude.

The iterations in stage 3 use a process similar to stages 1 and 2 above, except that no sign information needs to be coded. An offset is computed according to the number of pulses and number of positions left in the iteration, then an index for the particular pulse combination in the iteration is determined.

The iterative process for stage 3 can be described as follows. Each iteration k starts by redefining the track $t^{(k)}$ as to include only the positions of non-zero pulses in the previous iteration's track vector $t^{(k-1)}$. The number of non-zero pulses in $t^{(k-1)}$ is defined as the new track length $n^{(k)}$, and the new number of unit magnitude pulses $m^{(k)}$ is given by the number of unit magnitude pulses in the previous iteration $m^{(k-1)}$ minus the number of non-zero pulses $d^{(k-1)}$. Then, the non-zero pulse magnitudes in $t^{(k-1)}$ are decremented by one to obtain the pulse magnitudes in $t^{(k)}$. The number of non-zero magnitude pulses left in $t^{(k)}$ is defined as $d^{(k)}$, and the vector of non-zero pulse positions as $\lambda^{(k)}$. Equations (22) and (23) are then used to compute an index and an offset into the stage 3 subgroup.

$$I_{off}(d^{(k)}, m^{(k)}, n^{(k)}) = \begin{cases} \sum_{i=d^{(k)}+1}^{m^{(k)}} F(n^{(k)}, i) \cdot D(m^{(k)}, i), & d^{(k)} < m^{(k)} \\ 0, & d^{(k)} = m^{(k)} \end{cases} \quad (22)$$

$$I_{pos}(\lambda^{(k)}, d^{(k)}) = \sum_{i=0}^{d^{(k)}-1} F(\lambda_i^{(k)}, i+1) \quad (23)$$

Figure 6:
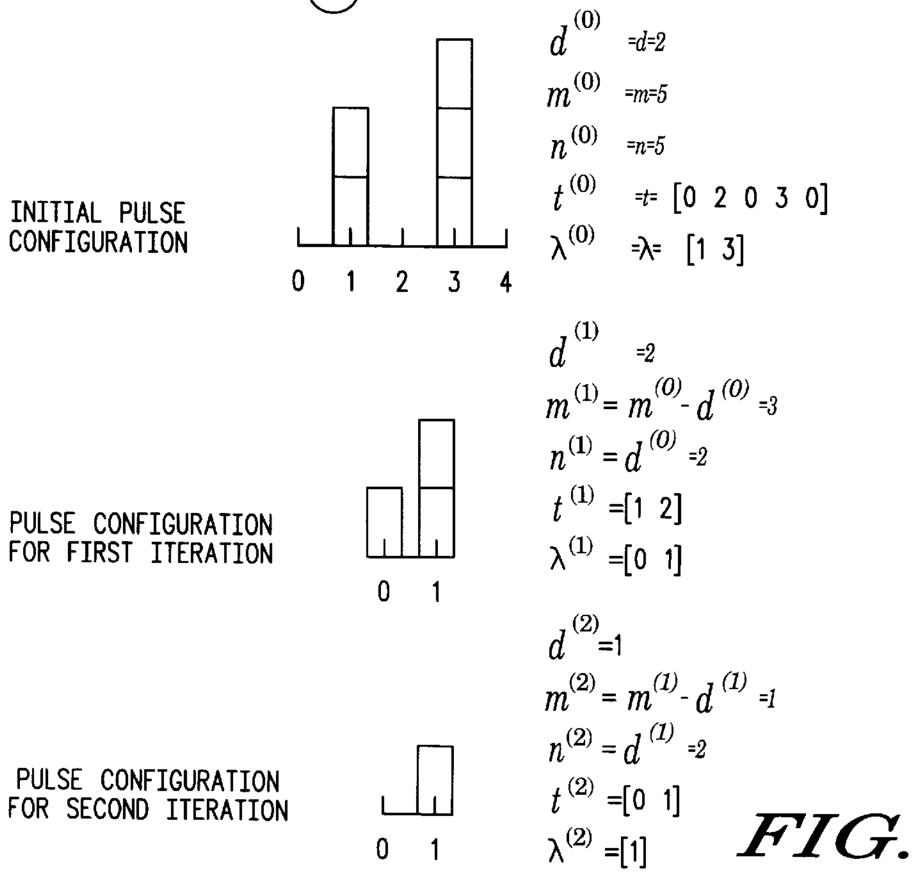
FIG. 6 generally depicts stage 3 iterations using, as an example, m=5 unit magnitude pulses in a n=5 position track.

Equation (22) is obtained from the same derivation as equation (17), except that no sign information needs to be coded, and equation (23) is the same as equation (18), shown again here for convenience. FIG. 6 depicts the stage 3 iterations, using as an example m=5 unit magnitude pulses in a n=5 position track.

After all iterations are performed, the offset into the corresponding stage 3 subgroup is given by:

$$offset_{stage3} = 2^d \cdot \sum_{k=1}^{m-d+1} (I_{off}(d^{(k)}, m^{(k)}, n^{(k)}) + D(m^{(k)}, d^{(k)}) \cdot I_{pos}(\lambda^{(k)}, d^{(k)})), \quad (24)$$

In stage 4, the last stage, a sign combination out of the $2^d$ possibilities is selected. Each of the d sign bits $s_j$ ($0 \leqq j < d$) is associated with a particular non-zero pulse in t; a one in bit $s_j$ meaning the $j^{th}$ non-zero pulse is negative, a zero meaning the pulse is positive, or vice versa. The sign bits index for a particular pulse combination t is represented by:

$$index_{stage4} = S_{pos}(t) = \sum_{j=0}^{d-1} s_j \cdot 2^{d-j-1}. \quad (25)$$

The final codeword is obtained by combining the offsets and index from the four stages, yielding:

$$\begin{aligned} \text{codeword} &= \sum_{i=1}^{3} offset_{stagei} + index_{stage4} \\ &= S_{pos}(t) + S_{off}(d, m, n) + 2^d \cdot D(m, d) \cdot I_{pos}(\lambda, d) + 2^d \cdot \sum_{k=1}^{m-d+1} (I_{off}(d^{(k)}, m^{(k)}, n^{(k)}) + D(m^{(k)}, d^{(k)}) \cdot I_{pos}(\lambda^{(k)}, d^{(k)})) \end{aligned} \quad (26)$$

Noticing from equation (17) that $S_{off}$(d,m,n) is divisible by $2^d$, equation (26) can be rewritten as:

$$\text{codeword} = S_{pos}(t) + 2^d \cdot \left( \begin{array}{c} \sum_{i=d+1}^{m} (D(m, i) \cdot F(n, i) \cdot 2^{i-d}) + D(m, d) \cdot \\ I_{pos}(\lambda, d) + \sum_{k=1}^{m-d+1} (I_{off}(d^{(k)}, m^{(k)}, n^{(k)}) + \\ D(m^{(k)}, d^{(k)}) \cdot I_{pos}(\lambda^{(k)}, d^{(k)})) \end{array} \right). \tag{27}$$

Figure 7:
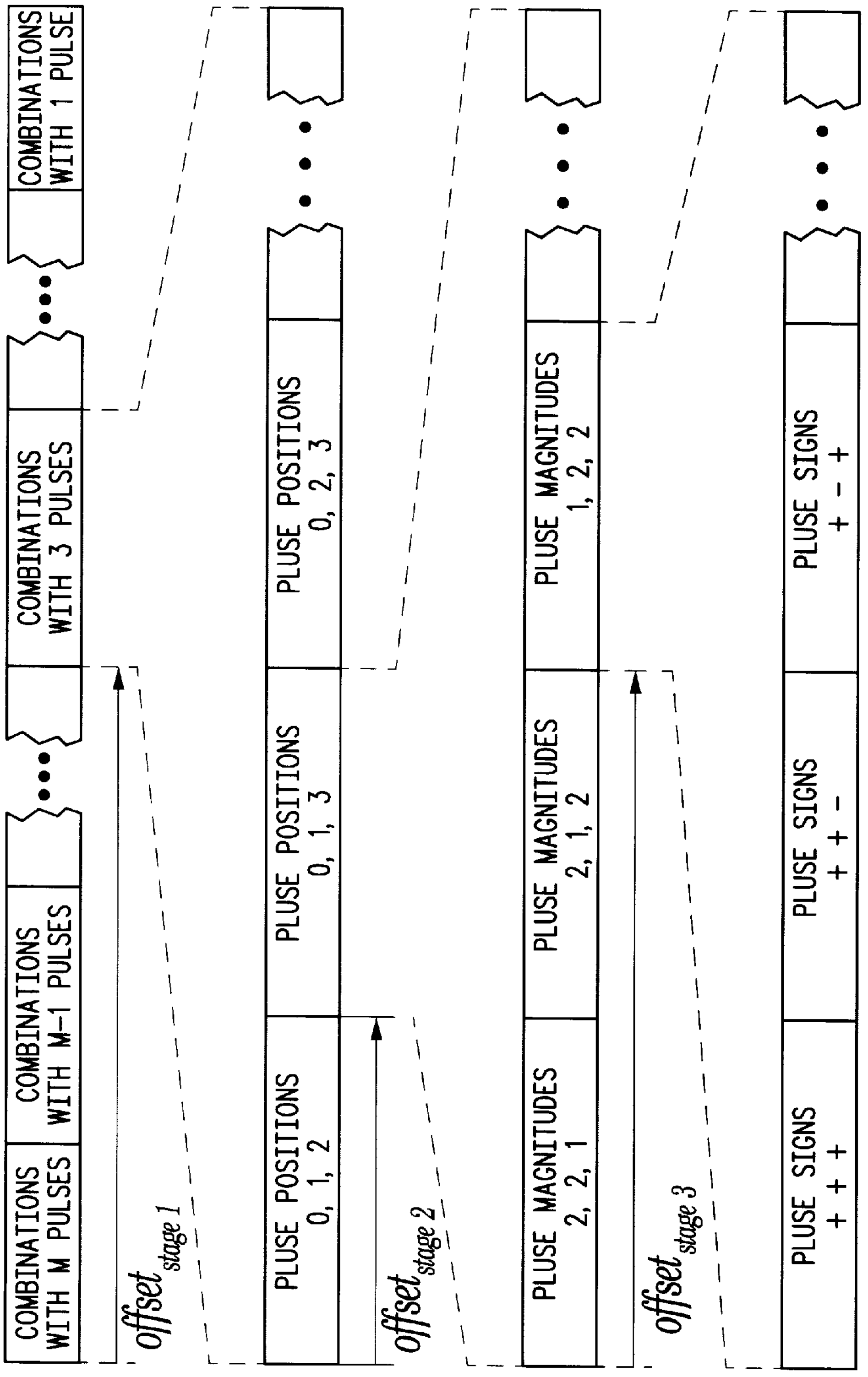
FIG. 7 depicts how the codeword space is grouped according to the four classification stages in accordance with the invention.

Equation (27) reveals how the sign bits, represented by $S_{pos}(t)$, are orthogonal to the rest of the coded information bits. This allows for the sign bits to be easily decoded and to be assigned extra error protection if considered to have higher sensitivity to errors than the rest of the codeword bits. FIG. 7 depicts how the codeword space is grouped according to the four classification stages in accordance with the invention.

Unpacking the codeword back into the track vector t involves determining the offsets from each of the four stages described above. First, the number of degenerate pulses d is determined by finding the minimum value of $d_u$ that satisfies:

$$\text{codeword} \geqq S_{off}(d_u, m, n), \tag{28}$$

where m and n are known.

Now, knowing the number of pulses also determines the number of sign bits. The d least significant bits from codeword are extracted as the sign bits $s_j$.

The next step is to determine the positions of the d pulses. The offset from the first stage and the sign bits are removed to determine the second stage offset at the decoder. This is obtained with:

$$dec_{stage2} = \left\lfloor \frac{\text{codeword} - S_{off}(d, m, n)}{2^d} \right\rfloor. \tag{29}$$

Looking back at equation (26) and noticing that the last term is less than or equal to $2^d \cdot D(m,d)$, the position index is extracted with:

$$I_{pos} = \left\lfloor \frac{dec_{stage2}}{D(m, d)} \right\rfloor. \tag{30}$$

Obtaining the actual pulse positions from $I_{pos}$ above involves reversing equation (18). The extraction of the pulse position vector $\lambda$ exploits the fact that for the last pulse position $\lambda_{d-1}$ in $I_{pos}$ the following expression:

$$F(\lambda_{d-1} + 1, d) > \sum_{i=0}^{d-1} F(\lambda_i, i + 1), \tag{31}$$

is always satisfied.

Figure 8:
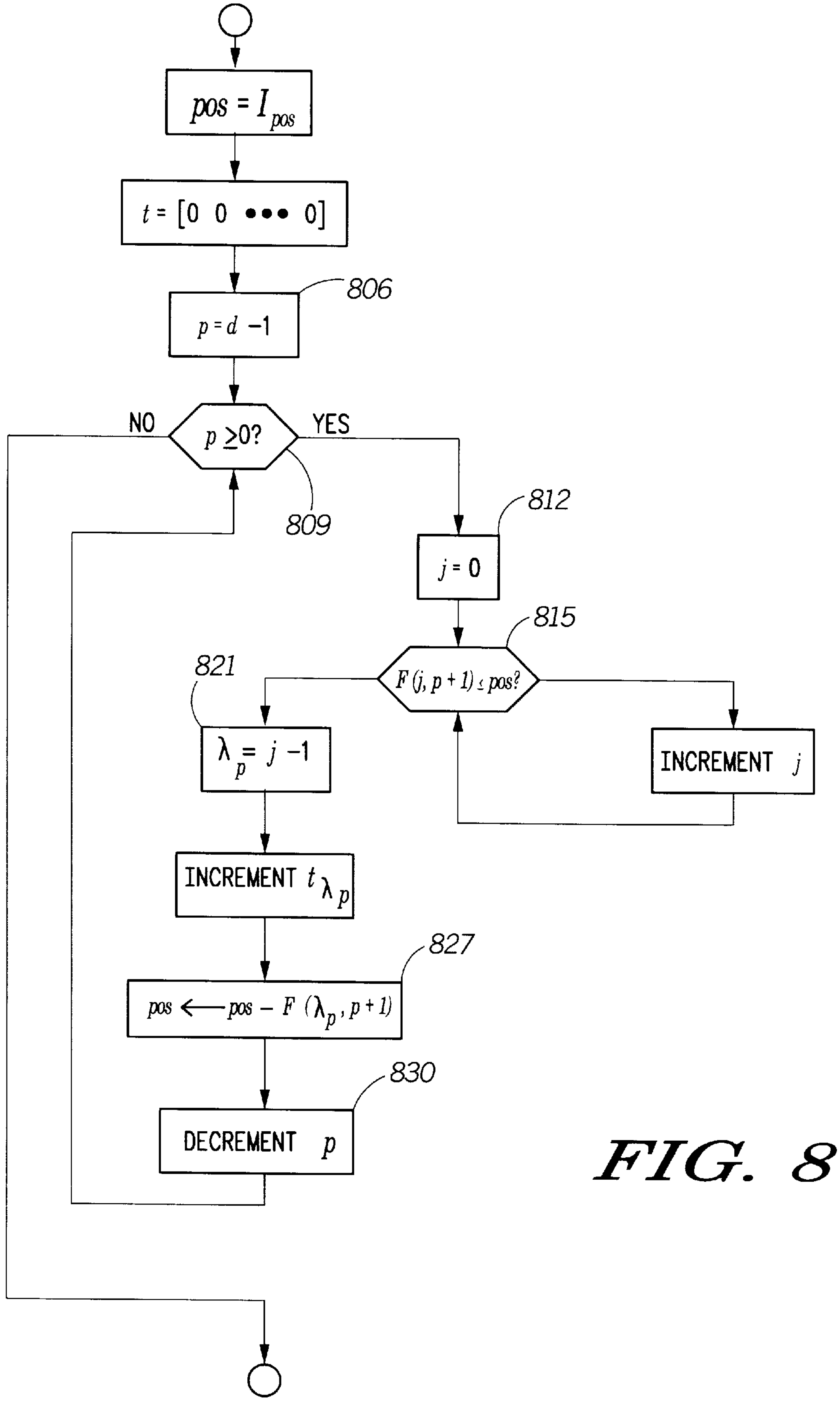
FIG. 8 depicts a flow chart which describes the process to obtain pulse positions in accordance with the invention.

FIG. 8 generally depicts a flow chart which describes the process for obtaining pulse positions in accordance with the invention. The output of the flow chart shown in FIG. 8 is the position vector $\lambda=[\lambda_0\ \lambda_1\ .\ .\ .\ <\lambda_{d-1}]$. Also, the pulse magnitude vector t will contain a "1" on each position specified by the elements of $\lambda$.

Obtaining the pulse magnitudes involves reversing the computation of equation (24). For each iteration k, the number of unit magnitude pulses left and the track length are given by:

$$m^{(k)}=m^{(k-1)}-d^{(k-1)}\ n^{(k)}=d^{(k-1)}, \tag{31}$$

and the number of pulses $d^{(k)}$ is determined by finding the minimum value $d_u^{(k)}$ that satisfies:

$$\text{code}^{(k)} \geqq I_{off}(d_u^{(k)}, m^{(k)}, n^{(k)}). \tag{32}$$

The iteration codeword is obtained with:

$$\text{code}^{(k+1)}=\text{code}^{(k)}-I_{off}(d^{(k)},m^{(k)},n^{(k)})-I_{pos}{}^{(k)}\cdot D(m^{(k)}, d^{(k)}), \tag{33}$$

where:

$$I_{pos}^{(k)} = \left\lfloor \frac{code^{(k)} - I_{off}(d^{(k)}, m^{(k)}, n^{(k)})}{D(m^{(k)}, d^{(k)})} \right\rfloor, \tag{34}$$

and:

$$\text{code}^{(1)}=dec_{stage2}-I_{pos}\cdot D(m,d). \tag{36}$$

Figure 9:
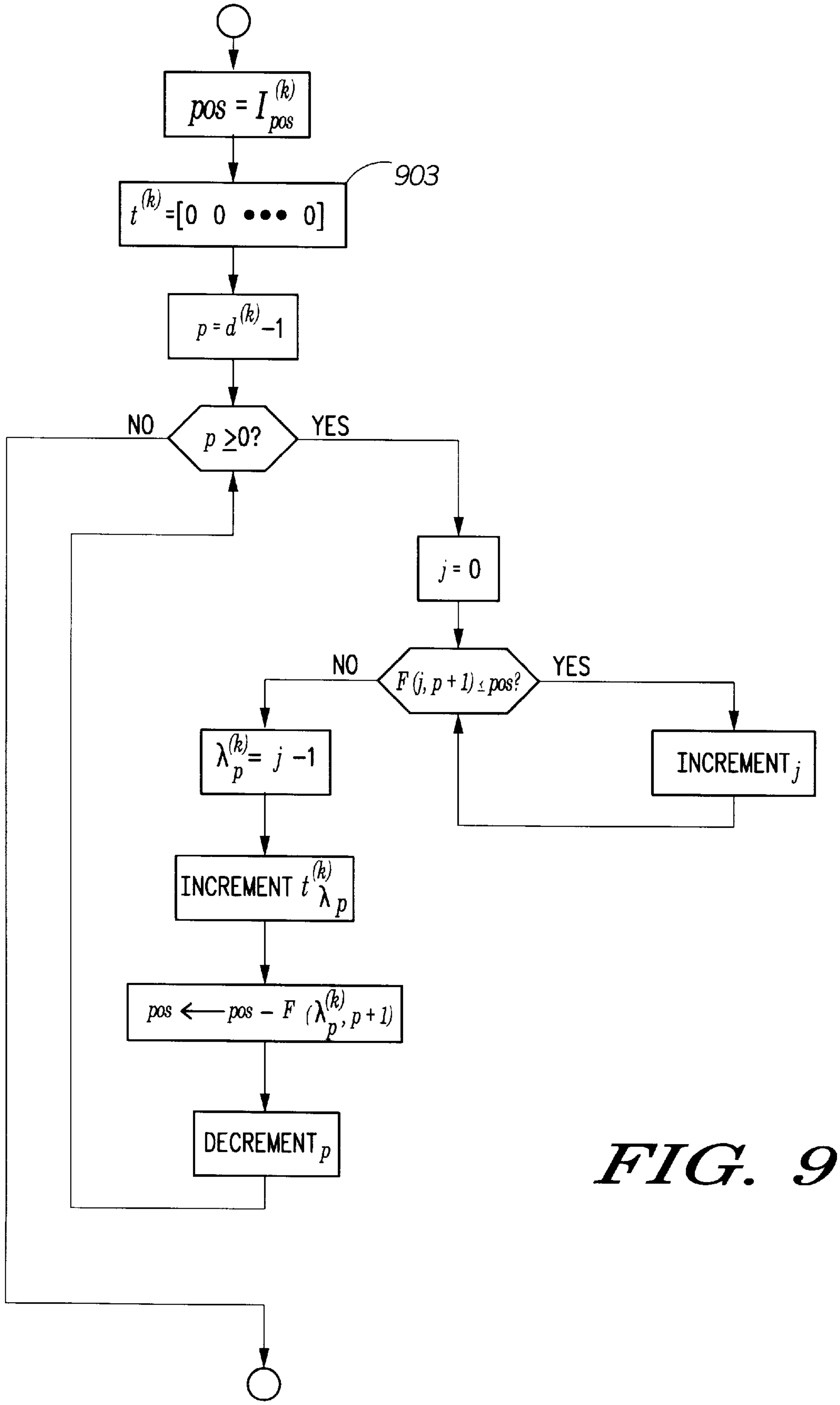
FIG. 9 depicts a flow chart which describes the process to obtain pulse position vectors based on the flow chart of FIG. 8 in accordance with the invention.

Determining the pulse positions vector $\lambda^{(k)}$ for each iteration is done by using the flow chart of FIG. 9, which is obtained from the flow chart of FIG. 8 by substituting d, $\lambda$, and t with $d^{(k)}$, $\lambda^{(k)}$, and $t^{(k)}$. The iterations are performed for as long as $m^{(k)}$ in equation (31) is greater than zero. The maximum value of k that satisfies this condition is defined as $k_{max}$. Now the process, depicted in FIG. 9, involves initializing the pulse index p to the last pulse in 806, and repeating 812–830 for every pulse position. For each pulse index p, 815 finds the leftmost position j that satisfies equation (31), with p replacing d. The current pulse position $\lambda_p$ is set to j−1 in 821. Then, the contribution of the current pulse to $I_{pos}$ is removed in 827. The pulse position index is decremented in 830 to start the next iteration.

Figure 10:
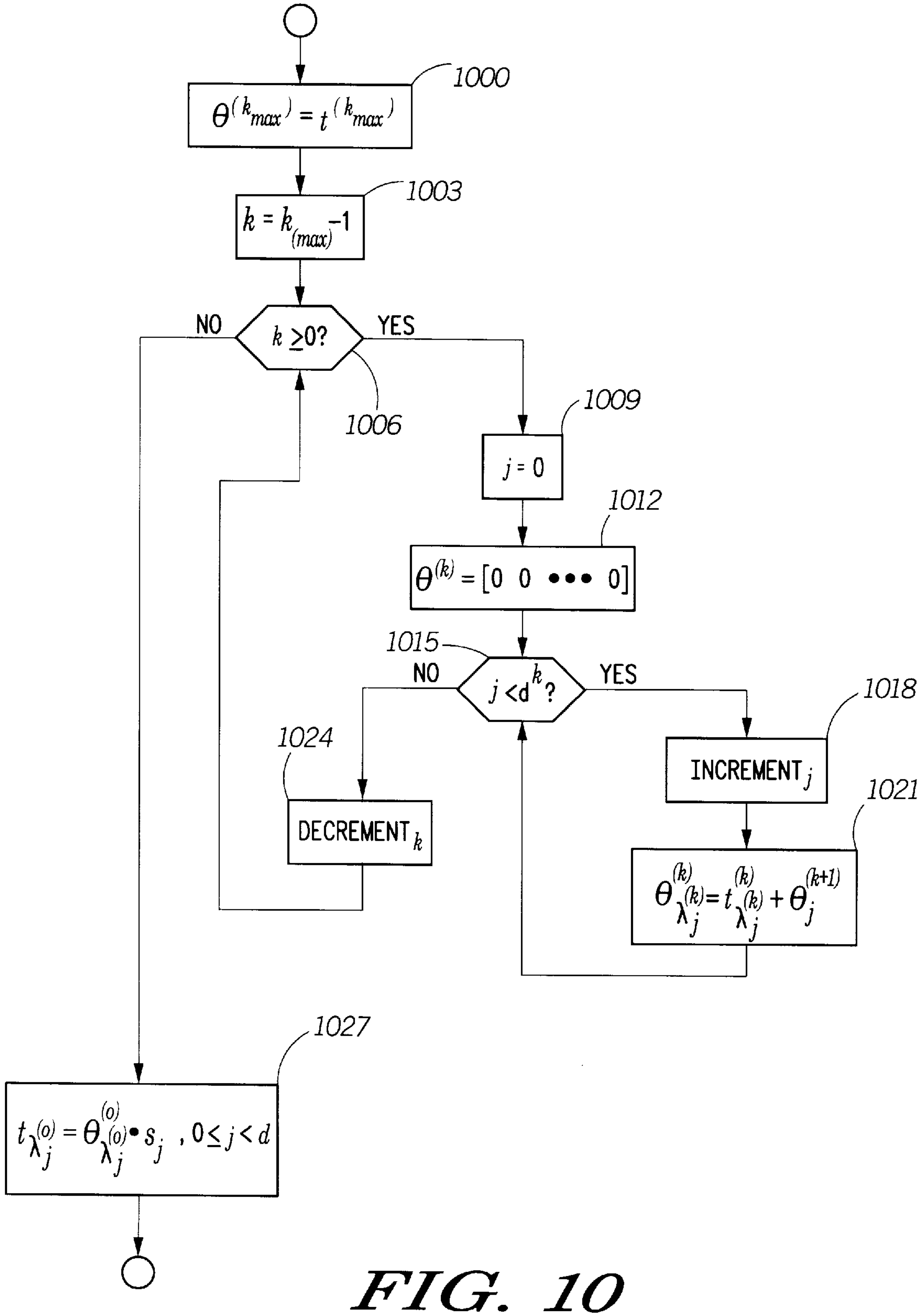
FIG. 10 generally depicts a flow chart which describes the process to determine pulse magnitudes in accordance with the invention.

Once the track vectors for each iteration $t^{(k)}$ and $k_{max}$ are known, the pulse magnitudes in t are obtained using the flow chart shown in FIG. 10. First, the temporary track vector $\theta^{(k_{max})}$ is set to $t^{(k_{max})}$ at step 1000. Then, steps 1009–1024 are repeated for each k satisfying $0 \leqq k < k_{max}$. At step 1012, a temporary track vector $\theta^{(k)}$ for each k is initialized. Steps 1015–1021 then accumulate the pulse magnitudes from the previous iteration's $\theta^{(k+1)}$ with the current track vector $t^{(k)}$ into $\theta^{(k)}$ and step 1024 decrements k to start the next iteration. The actual track vector t is obtained at step 1027 by applying the signs $s_j$ to the pulses in $\theta^{(0)}$.

The process of unpacking the pulse magnitudes has been presented here in two steps (FIG. 9 and FIG. 10) for the purpose of explaining the unpacking process in accordance with the invention. As one skilled in the art will appreciate, the two steps could be combined into one step for efficient implementation.

Figure 11:
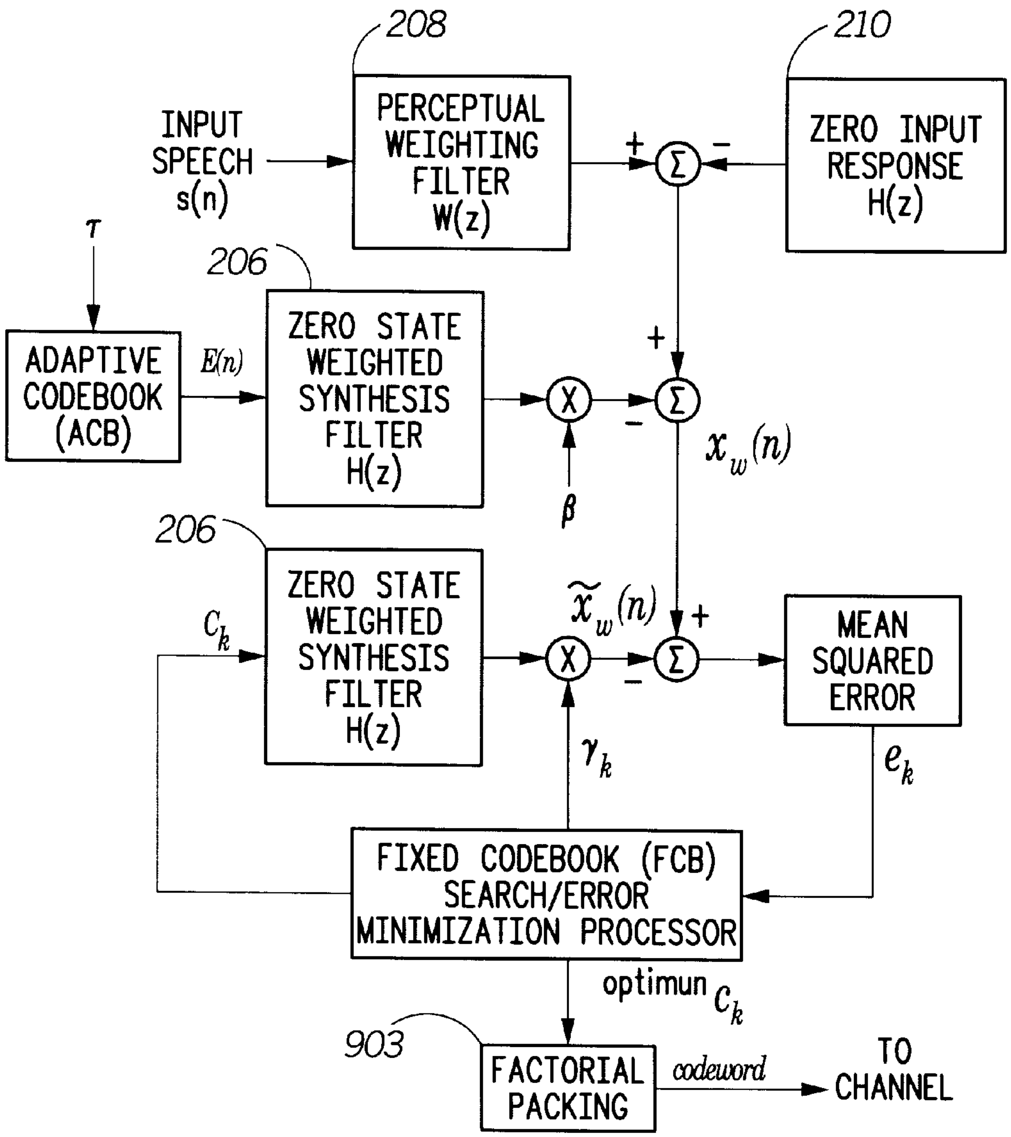
FIG. 11 generally depicts a Code Excited Linear Prediction (CELP) which implements factorial packing in accordance with the invention.

FIG. 11 generally depicts a CELP encoder including factorial packing in accordance with the invention. As shown in FIG. 11, certain elements are similar in operation as those of the CELP encoder shown in FIG. 2, thus like elements are shown with like numerals. The fixed codebook (FCB) 202 and the error minimization process 214 of FIG. 2 are combined in FIG. 11 and output an optimum codevector $c_k$ which is utilized by the factorial packing block 903 in accordance with the invention. The factorial packing block 903 outputs a codeword, as described above in accordance with the invention, which is sent to a destination via a channel.

While the invention has been particularly shown and described with reference to a particular embodiment, it will be understood by those skilled in the art that various changes in form and details may be made therein without departing from the spirit and scope of the invention. For example, the methods contained herein could be applied to coding spectral magnitude information in which the sign information is implied to be always positive. The steps involving the coding of pulse sign information could be omitted from the process although the concepts presented by this invention are clearly implied. Similarly, the invention can also be applied to cases in which all positions are always non-zero.

This would also simplify the implementation of the invention, but this would not deviate from the spirit or scope of the invention. The corresponding structures, materials, acts and equivalents of all means or step plus function elements in the claims below are intended to include any structure, material, or acts for performing the functions in combination with other claimed elements as specifically claimed.

What we claim is:

1. A method of coding a speech signal in a communication system comprising the steps of:

a) dividing the speech signal into blocks;

b) deriving a target signal based on a block of the speech signal;

c) generating a quantized signal which is representative of the target signal;

d) generating a codeword which is comprised of a sum of offsets or indices which relate to the respective number of pulses, pulse positions, and pulse magnitudes, wherein at least one of the offsets or indices is based on the relation:

$$F(n,\ d) = \frac{n!}{d!(n-d)!};\ \text{and}$$

e) transmitting said codeword to a destination.

2. The method of claim 1, wherein the speech signal is a speech, audio, image, or video signal.

3. The method of claim 1, wherein the blocks of information signals further comprise frames or subframes of information signals.

4. The method of claim 1, wherein the quantized signal further comprises a codevector $c_k$.

5. The method of claim 1, wherein the offset or index related to the pulse magnitude information is based on a degenerate combination:

$$D(m,\ d) = \frac{(m-1)!}{(d-1)!(m-d)!}$$

where d is a number of non-zero elements and m is a total number of unit magnitude pulses.

6. A method of generating a codeword in a communication system comprising the steps of:

dividing a codeword space into a group representing a particular number of pulses and determining a first offset related thereto;

subdividing the group representing a particular number of pulses into subgroups representing particular pulse positions and determining a second offset related thereto;

subdividing a subgroup representing particular pulse positions into further subgroups representing particular pulse magnitudes and determining a third offset related thereto;

determining an index representing a particular pulse sign combination; and summing the first, second and third offsets and the index to generate the codeword.

7. The method of claim 6, wherein the first offset is a stage1 offset and is given by the equation $$offset_{stage1} = S_{off}(d,\ m,\ n) = \begin{cases} \sum_{i=d+1}^{m} D(m,\ i)\cdot F(n,\ i)\cdot 2^i, & d < m \\ 0, & d = m \end{cases}$$

where n is the decimated track length, d is the number of pulses and m is the total number of unit magnitude pulses used to generate the d pulses.

8. The method of claim 6, wherein the second offset is a stage2 offset, and is given by the equation $$\text{offset}_{stage2} = I_{pos}(\lambda,d)\cdot D(m,d)\cdot 2^d$$

where $I_{pos}$ is the index of the position information, $\lambda \equiv [\lambda_0\ \lambda_1\ \ldots\ \lambda_{d-1}]$, with $\lambda_i$ representing the decimated pulse position of pulse i in the track vector of pulse magnitudes t and $D(m,d)\cdot 2^d$ is the number of elements in a subgroup.

9. The method of claim 7, wherein the third offset is a stage3 offset, and is given by the equation $$offset_{stage3} = 2^d\cdot\sum_{k=1}^{m-d+1}\left(I_{off}(d^{(k)},\ m^{(k)},\ n^{(k)}) + D(m^{(k)},\ d^{(k)})\cdot I_{pos}(\lambda^{(k)},\ n^{(k)})\right).$$

10. The method of claim 7, wherein the index is a stage4 index, and is given by the equation $$index_{stage4} = S_{pos}(t) = \sum_{j=0}^{d-1} s_j\cdot 2^{d-j-1}.$$

11. An apparatus for coding a speech signal in a communication system, the apparatus comprising:

a) means for dividing the speech signal into blocks, b) means for deriving a target signal based on a block of the speech signal;

c) means for generating a quantized signal which is representative of the target signal;

d) means for generating a codeword which is comprised of a sum of offsets or indices which relate to the respective number of pulses, pulse positions, and pulse magnitudes, wherein at least one of the offsets or indices is based on the relation:

$$F(n,\ d) = \frac{n!}{d!(n-d)!};\ \text{and}$$

e) transmitting said codeword to a destination.

12. The apparatus of claim 11, wherein the blocks of information signals further comprise frames or subframes of information signals.

13. The apparatus of claim 11, wherein the quantized signal further comprises a codevector $c_k$.

* * * * *